(12) United States Patent
Brandstätter

(10) Patent No.: US 7,805,886 B2
(45) Date of Patent: Oct. 5, 2010

(54) PLANT POT ARRANGEMENT

(75) Inventor: Horst Brandstätter, Zirndorf (DE)

(73) Assignee: Geobra Brandstatter GmbH & Co. KG, Zirndorf (DE)

( * ) Notice: Subject to any disclaimer, the term of this patent is extended or adjusted under 35 U.S.C. 154(b) by 206 days.

(21) Appl. No.: 11/604,399

(22) Filed: Nov. 27, 2006

(65) Prior Publication Data

US 2007/0119097 A1 May 31, 2007

(30) Foreign Application Priority Data

Nov. 26, 2005 (DE) .................. 20 2005 018 519

(51) Int. Cl.
*A01G 23/04* (2006.01)

(52) U.S. Cl. .............. 47/75; 47/65.5; 220/761

(58) Field of Classification Search ........ 47/73, 47/75, 65.5, 66.1, 68; 220/761; 16/444; A01H 23/02, A01H 23/04
See application file for complete search history.

(56) References Cited

U.S. PATENT DOCUMENTS

| | | | |
|---|---|---|---|
| 495,808 A * | 4/1893 | Holt .............................. 47/75 |
| 525,644 A * | 9/1894 | Babbitt .......................... 47/75 |
| 923,663 A * | 6/1909 | Kroeger ......................... 47/75 |
| 1,472,508 A * | 10/1923 | Beckman ..................... 16/444 |
| 1,665,124 A * | 4/1928 | Wright .......................... 47/73 |
| 1,959,800 A * | 5/1934 | Rogge ........................... 47/75 |
| 1,987,255 A * | 1/1935 | Husted ........................ 47/32.7 |
| 4,223,480 A | 9/1980 | Welty |
| 5,088,618 A * | 2/1992 | Colombo ................. 220/23.83 |
| 5,099,608 A | 3/1992 | Casey |
| 5,291,976 A * | 3/1994 | Ku .............................. 190/18 A |
| 5,471,788 A * | 12/1995 | Willes ............................ 47/75 |
| 5,644,806 A * | 7/1997 | Mariol et al. ................... 5/99.1 |
| 5,768,825 A * | 6/1998 | Reiger ............................ 47/78 |
| 6,088,962 A | 7/2000 | Johnson |
| 6,202,254 B1 * | 3/2001 | Ezer .......................... 16/113.1 |

FOREIGN PATENT DOCUMENTS

| | | |
|---|---|---|
| DE | 9011760 U1 | 1/1991 |
| DE | 40 04 136 C1 | 6/1991 |
| DE | 4004136 C1 | 6/1991 |
| DE | 103 27 175 A1 | 12/2004 |
| EP | 1 593 301 A1 | 11/2005 |

* cited by examiner

*Primary Examiner*—Rob Swiatek
*Assistant Examiner*—Kristen C Hayes
(74) *Attorney, Agent, or Firm*—Browdy and Neimark, PLLC

(57) ABSTRACT

Plant pot arrangement comprising an over pot, an insert container positioned in the over pot and removable therefrom, for receiving a plant, the insert container defining a space for a plant, and being open at an upper container edge, and at least one handle being movable in a guided manner in a handle guide in a pull-out direction and being positioned in the region of the container edge (16; 16*a*), for removing the insert container from the over pot.

15 Claims, 8 Drawing Sheets

US 7,805,886 B2

PLANT POT ARRANGEMENT

BACKGROUND OF THE INVENTION

1. Field of the Invention

The invention relates to a plant pot arrangement.

2. Background Art

A plant pot arrangement is known from DE 40 04 136 C1 comprising an over pot and an insert container which may be introduced therein. To remove the insert container from the over pot, projections are formed on the insert container in the region of the upper edge of the container and they extend into correspondingly formed recesses in the over pot. A disadvantage of a plant pot arrangement of this type is that it is not very attractive.

SUMMARY OF THE INVENTION

The object of the invention is to provide an aesthetically pleasing plant pot arrangement which allows an insert container to be easily removed from an over pot.

This object is achieved by an over pot, an insert container positioned in the over pot and removable therefrom, for receiving a plant, the insert container defining a space for a plant, and being open at an upper container edge, and at least one handle being movable in a guided manner in a handle guide in a pull-out direction and being positioned in the region of the container edge, for removing the insert container from the over pot. The essence of the invention is that the at least one handle positioned in the region of the edge of the container may be moved in a guided manner in the handle guide. To achieve an aesthetic, decorative effect of the plant pot arrangement, the at least one handle may be inserted in the handle guide counter to the pull-out direction, so that said handle is substantially invisible. To remove the insert container from the over pot, the at least one handle may be pushed out in the removal direction so that it is easily possible to grasp the at least one handle and lift out the insert container.

Additional features and advantages of the invention will become apparent from the description of a plurality of embodiments with reference to the drawings.

DESCRIPTION OF THE PREFERRED EMBODIMENTS

Figure 1:
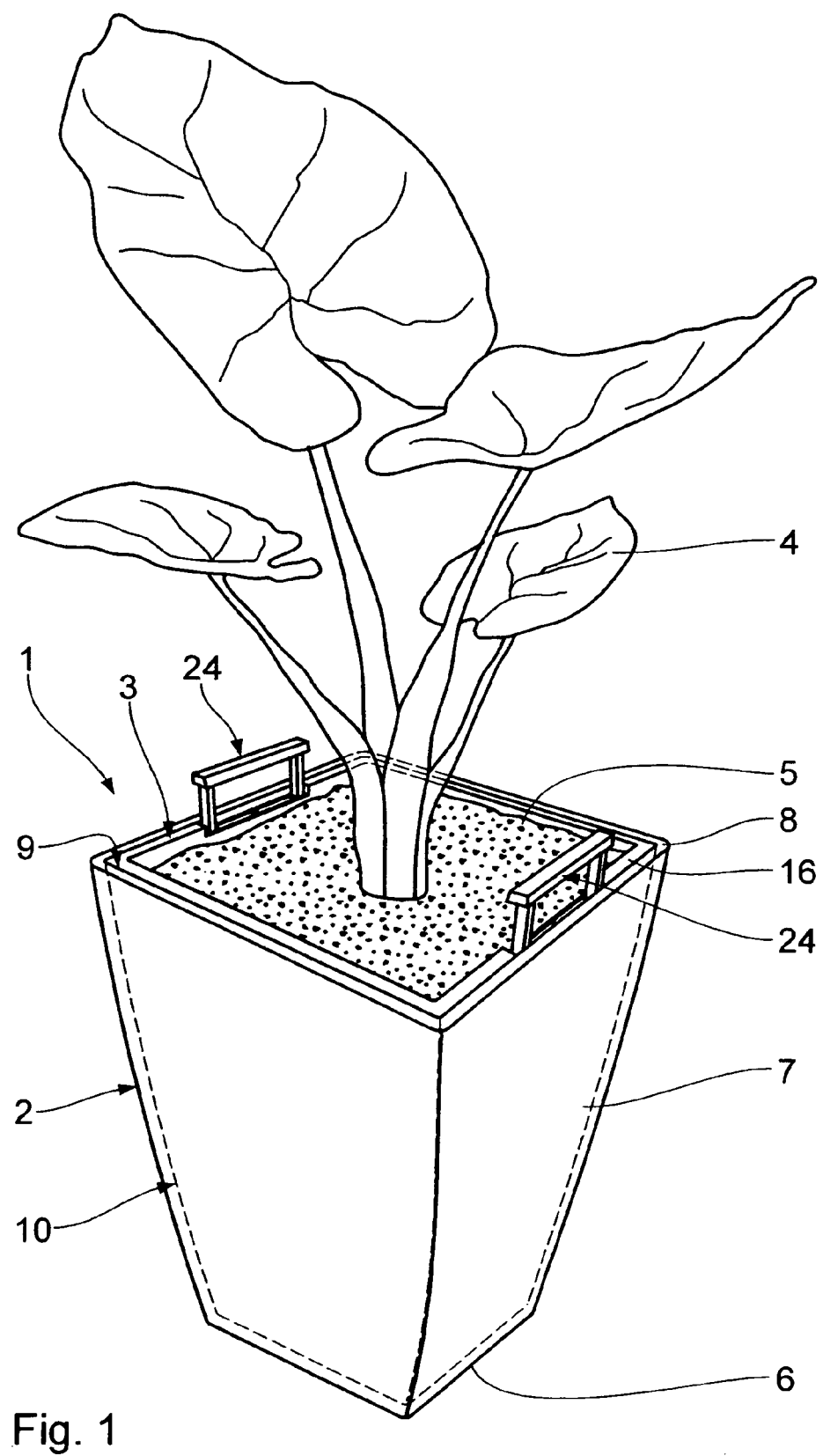
FIG. 1 a perspective view of a plant pot arrangement according to a first embodiment with an insert container which contains a plant and has been prepared for removal, FIG. 2 a perspective view of the insert container of FIG. 1 without a plant, FIG. 3 a perspective view of a handle of the insert container of FIG. 2 in a partly pulled-out state, FIG. 4 a perspective view of the handle of FIG. 3 in a fully pulled-out state, FIG. 5 a section through the handle of FIG. 4 along line V-V, FIG. 6 a section through the handle corresponding to FIG. 5 in a fully inserted state, FIG. 7 a perspective view of an insert container of a plant pot arrangement according to a second embodiment, FIG. 8 a transparent side view of the insert container of FIG. 7, and FIG. 9 a perspective view of a handle of the insert container of FIG. 7 in a partly pulled-out state.
Figure 2:
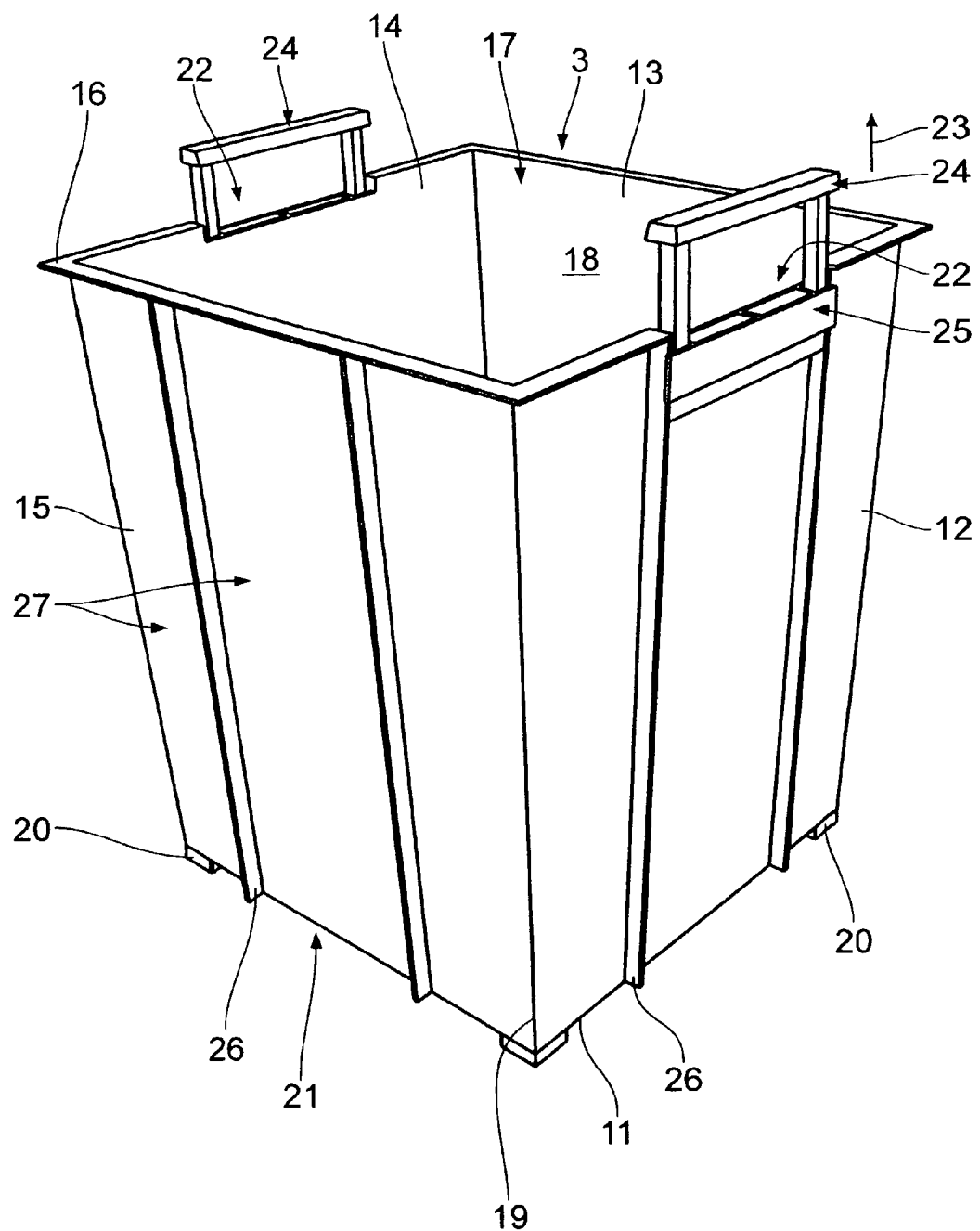
Figure 3:
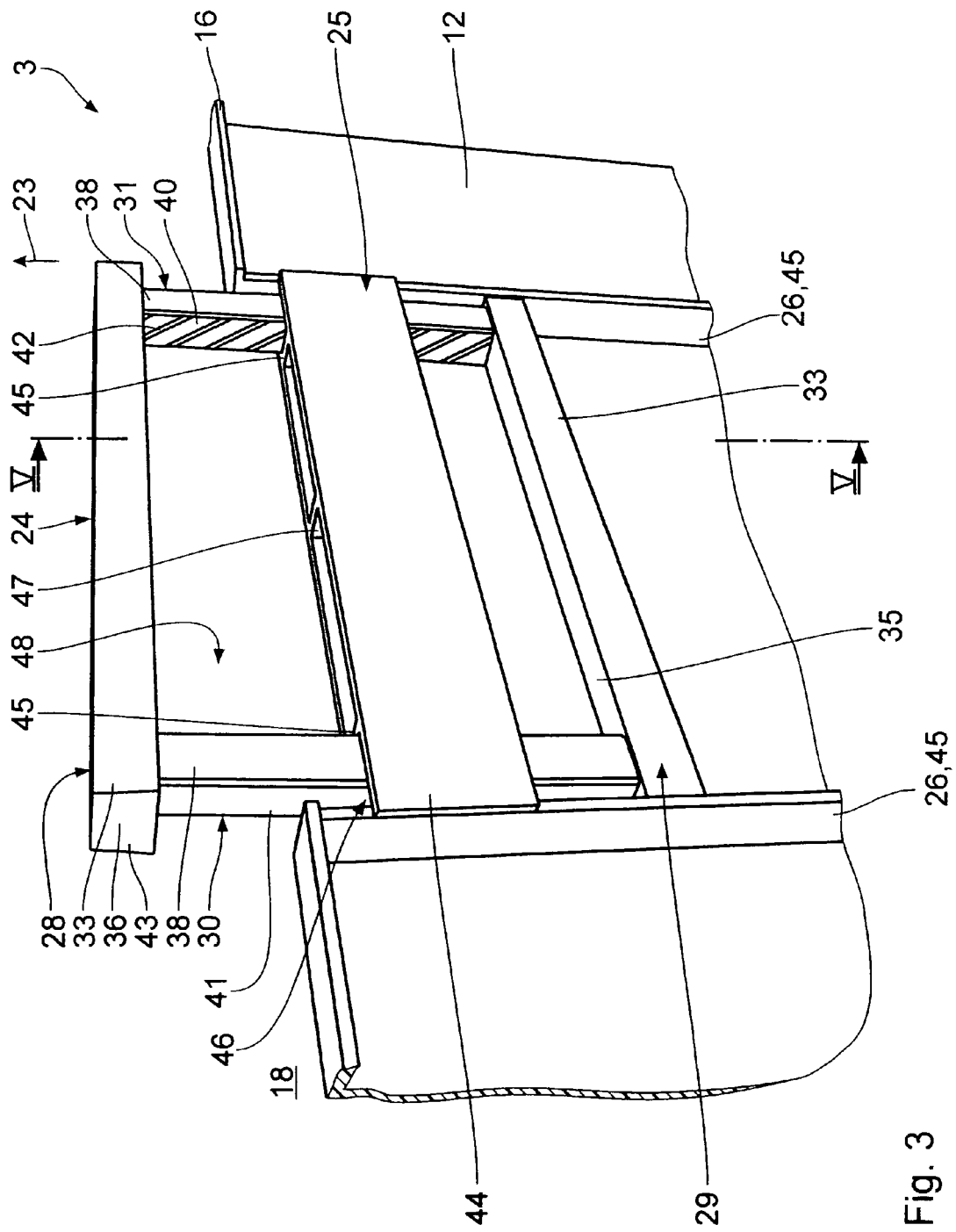
Figure 4:
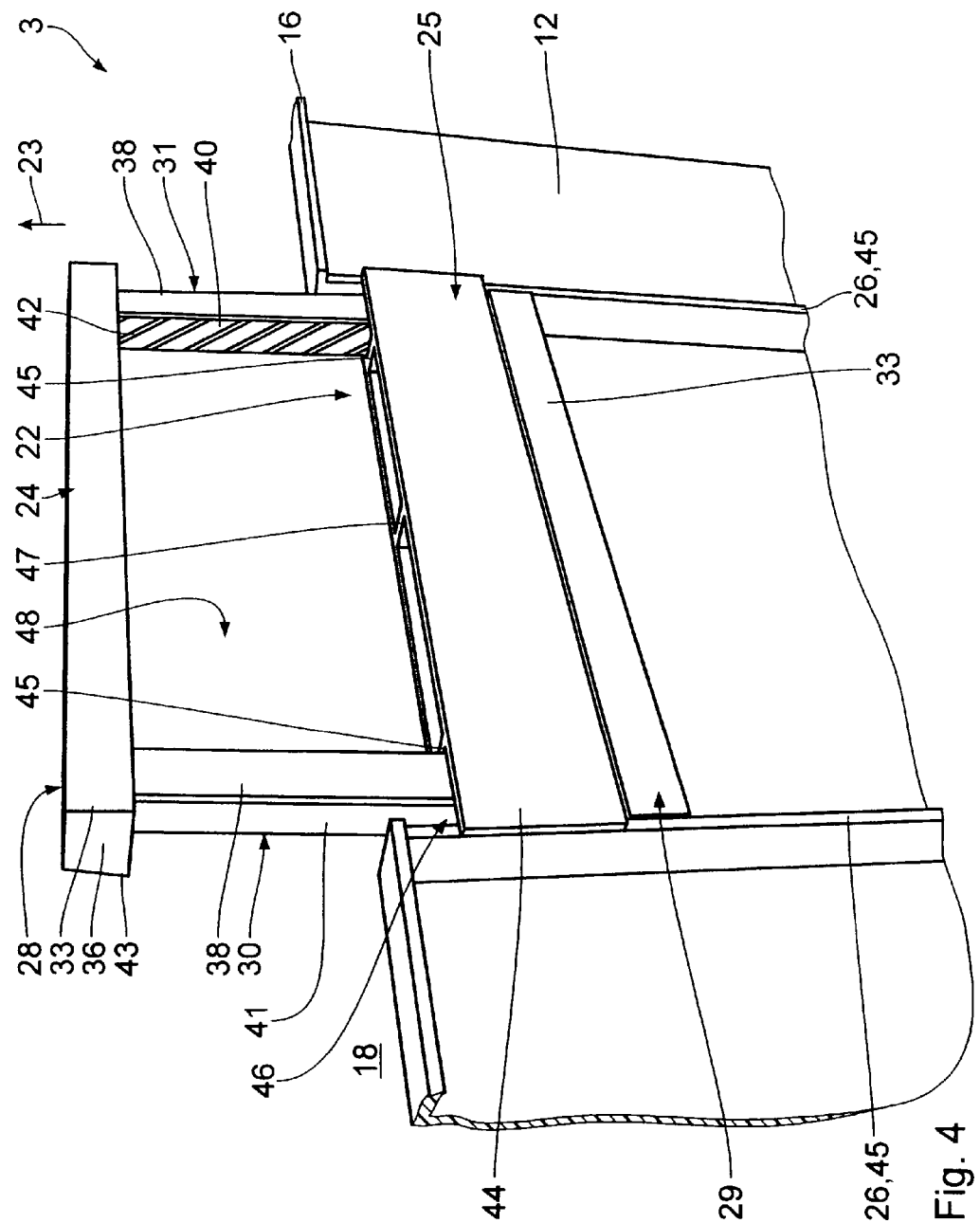

A first embodiment of the invention will be described in the following with reference to FIG. 1 to 6. A plant pot arrangement 1 shown in FIG. 1 has an over pot 2 and an insert container 3 which is positioned inside the over pot 2 and may be removed therefrom. The insert container 3 is filled with a substrate 5, for example potting compost, for planting a plant 4.

The over pot 2 has a substantially square base 6 and four side walls 7 positioned along the edges thereof. The side walls 7 extend from the base 6 such that the spacing between in each case two opposite side walls 7 increases in the direction of an insertion opening 9 defined by an over pot edge 8. The cross-sectional surface of the over pot 2 thus continuously increases starting from the over pot base 6 in the direction of the insertion opening 9. The over pot base 6 and the over pot side walls 7 define a receiving space 10 for accommodating the insert container 3. The over pot 2 is configured in one piece and is made of high-quality plastics material. The insert container 3 which may be introduced into the over pot 2 is substantially in the shape of the receiving space 10. The insert container 3 comprises a square base 11 and four side walls 12, 13, 14, 15 positioned along the edges thereof. The container side walls 12, 13, 14, 15 extend from the container base 11 such that the spacing between in each case two opposite side walls 12, 14 and 13, 15 increases in the direction of a plant opening 17 defined by an upper container edge 16. The base 11 and the side walls 12, 13, 145 15 of the container define a space 18 for a plant which is open due to the plant opening 17 in the region of the edge 16 of the container. In each case two adjacent side walls 12, 13, 14, 15 of the container form longitudinal edges 19 of the insert container 3. Spacers 20 are formed in one piece on the insert container 3 in the region of the longitudinal edges 19 on the side of the container base 11 opposite the plant space 18, said spacers 20 extending flush with the side walls 12, 13, 14, 15 of the container. After the container 3 has been inserted, the spacers 20 rest against the base 6 of the over pot, a first interspace 21 being formed between the base 6 of the over pot and the base 11 of the container.

The edge 16 of the container is angled relative to the side walls 12, 13, 14, 15 of the container such that it extends substantially horizontally outside the plant space 18. On two opposite container side walls 12, 14, the edge 16 and the side walls 12, 14 of the container have in each case a centrally located recess 22 for receiving a handle 24 which is positioned in the region of the container edge 16 and may be moved in a guided manner in a pull-out direction 23. A handle guide 25 is provided in each case for the guided movement of the handles 24. Alternatively, a handle 24 with a handle guide 25 may also be provided on all of the side walls 12, 13, 14, 15.

Two reinforcement struts 26 are formed in one piece in each case on the side walls 12, 13, 14, 15 of the container outside the plant space 18. Said reinforcement struts 26 extend from the base 11 of the container substantially in the pull-out direction 23 up to the edge 16 of the container, and they are connected integrally with the edge 16 of the container. The respective two reinforcement strips 26 belonging to a side wall 12, 13, 14, 15 of the container are mutually parallel and each have the same spacings from the adjacent longitudinal edges 19. The spacing between the parallel reinforcement struts 26 corresponds to the length of the recesses 22, so that said recesses 22 are laterally defined by the reinforcement struts 26.

When the container 3 has been inserted, the edge 16 thereof extends substantially flush with the edge 8 of the over pot. Formed between the side walls 12, 13, 14, 15 of the container and the side walls 7 of the over pot are two interspaces 27 which are connected to the base-side first interspace 21.

The handles 24 and the relevant handle guides 25 are positioned outside the plant space 18 and are configured identically on the side walls 12, 14 of the container, so that only handle 24 on the side wall 12 of the container will be described in the following. This handle 24 has a first crossbar 28 and a second parallel crossbar 29 which are integrally connected with a first longitudinal bar 30 and a second longitudinal bar 31 extending parallel to bar 30, substantially forming a rectangle. The longitudinal bars 30, 31 extend parallel to the pull-out direction 23, whereas the crossbars 28, 29 run transversely thereto. The crossbars 28, 29 each have an inner side wall 32 facing the plant space 18, an outer side wall 33 remote from the plant space 18, a lower side wall 34 facing the base 11 of the container and a side wall 35 remote from the container base 11, as well as end walls 36 facing the reinforcement struts 26. Corresponding to the crossbars 28, 29, the longitudinal bars 30, 31 have inner side walls 37, outer side walls 38 and end walls 39 facing the crossbars 28, 29. The longitudinal bars 30, 31 are formed on the crossbars 28, 29 with the end walls 39, the arrangement and the cross-section of the longitudinal bars 30, 31 being such that the cross bars 28, 29 project over the longitudinal bars 30, 31 in the region of their free ends. The longitudinal bars 30, 31 also have profiled side walls 40 facing one another and exposed side walls 41 opposite the profiled side walls 40.

Formed on the profiled side walls 40 of the longitudinal bars 30, 31 is a profiling 42 in the form of ribs running obliquely-to the pull-out direction 23. Alternatively, other profilings 42 are also possible. To grip the handle 24 more easily, the first cross-bar 28 has a projection 43 which extends into the plant space 18 and is formed in one piece on the inner side wall 32 and the lower side wall 34.

The longitudinal bars 30, 31 are received in the handle guide 25 such that the handle 24 may be moved in the pull-out direction 23. The handle guide 25 is formed by the side wall 12 of the container, a guide plate 44 extending parallel and at a distance to the container side wall 12 and by longitudinal struts 45 extending between the container side wall 12 and the guide plate 44 obliquely thereto. To receive a longitudinal rod 30, 31, the side wall 12, the guide plate 44 and the longitudinal struts 45 form a guide opening 46, a longitudinal strut 45 being configured as a reinforcement strut 26 for reinforcing the insert container 3. The longitudinal struts 45 facing the profiled side walls 40 have centrally between themselves a guide reinforcement 47 also configured as a longitudinal strut. The longitudinal struts 45 positioned between the profiled side walls 40 and the guide reinforcement 47 are each flush with the side wall 12 of the container and guide plate 44.

To guide the handle 24 when moved in the pull-out direction 23, the inner side walls 37 of the longitudinal bars 30, 31 rest against the side wall 12 of the container, the outer side walls 38 rest against the guide plate 44 and the profiled side walls 40 rest against the longitudinal bars 45. Furthermore, the inner side wall 32 of the second crossbar 29 rests against the side wall 12, 14 of the container and the end walls 36 of the second crossbar 29 rest against the reinforcement struts 26. When the handle 24 is moved, the end walls 36 of the first crossbar 28 also rest to some extent on the edge 16 of the container and the reinforcement struts 26.

To grip round the handle 24, the first crossbar 28, the longitudinal bars 30, 31 and the handle guide 25 delimit a reach-through opening 48, the size of which may be adjusted depending on the position of the handle 24 relative to the handle guide 25.

The insert container 3, the handles 24 and the handle guides 25 consist of plastics material, the handle guides 25 being formed in one piece with the insert container 3. To position the handles 24 in the respective handle guide 25, the guide plates 44 are configured to be flexible in the region of the reinforcement struts 26 and are not connected thereto.

Furthermore, an additional separating base may be positioned in the insert container 3, so that a water storage chamber is formed between the separating base and the container base 11. A water level indicator may also be provided to indicate the water level in the water storage chamber. Reference is made to DE 299 16 691 U1 with respect to the design and function of the water storage chamber.

Figure 5:
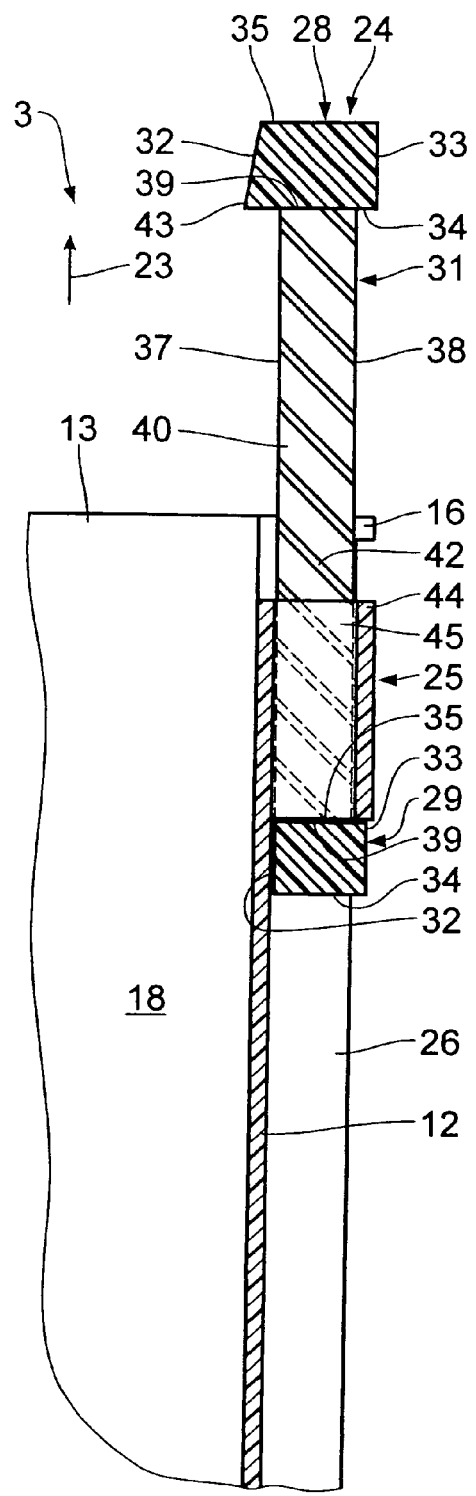
Figure 6:
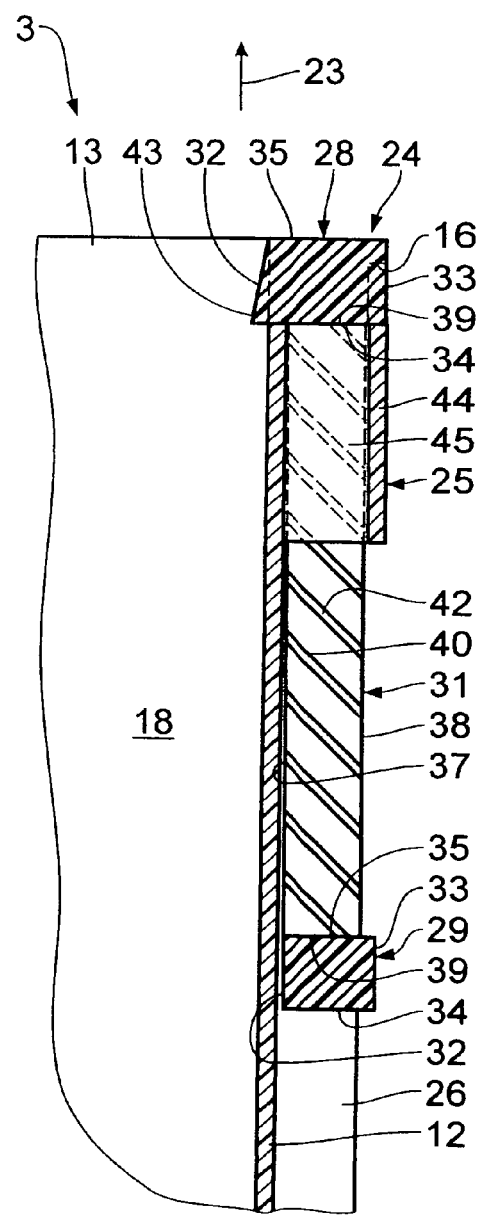

The mode of operation of the plant pot arrangement 1 will now be described in the following. Starting from a fully inserted state of the handles 24 according to FIG. 6, the pushing-out action of the handles 24 and the removal of the insert container 3 will be described first of all. In the fully inserted state, the first crossbars 28 of the handles 24 rest with their lower side walls 34 against the side walls 12, 14 of the container, the guide plates 44, the longitudinal bars 45 and the guide reinforcements 47, so that further movement of the handles 24 against the pull-out direction 23 is restricted. The upper side walls 35 of the handles 24 are flush with the edge 16 of the container. The projections 43 of the handles 24 project over the side walls 12, 14 of the container, the substrate 5 not overlapping the projections 43. In this state, the handles 24 are substantially invisible, so that the plant pot arrangement 1 is aesthetically pleasing and decorative. A force directed in the pull-out direction 23 is exerted on the projections 43 in order to push out the handles 24. The handles 24 are moved into the pull-out direction 23 as a result of said force, while the reach-through opening 48 increases in size. The handles 24 are guided in the respective handle guide 25, the profilings 42 increasing the friction between the profiled side walls 42 and the longitudinal bars 45 such that an automatic displacement of the handles 24 against the pull-out direction 23 is impossible without an additional external force, due to the shearing force. The handles 24 may be moved in the pull-out direction 23 until the second crossbars 29 strike with their upper side walls 35 against the guide plates 44, the longitudinal bars 45 and the guide reinforcements 47, and thus the displacement is restricted. This state is shown in FIG. 5. The handles 24 are now completely extended, with the reach-through openings 48 being at a maximum. It is now possible to simply grasp the first crossbars 28 of the handles 24, so that the insert container 3 may be removed by the handles 24 from the over pot 2.

Starting from the fully extended position of the handles 24 according to FIG. 5, the insertion of the insert container 3 into the over pot 2 and the pushing-in action of the handles 24 will now be described. The insert container 3 located outside the over pot 2 is inserted into the over pot 2 using the handles 24, the spacers 20 resting against the over pot 2. The interspaces 21, 27 make it possible for air to circulate between the over pot 2 and the insert container 3. Following insertion of the insert container 3, a force directed counter to the pull-out direction 23 is exerted on the handles 24, resulting in said handles 24 moving in the direction of the handle guides 25. With progressive movement of the handles 24, the reach-through openings 48 become smaller until the lower side walls 34 of the first crossbars 28 strike against the side walls 12, 14 of the container, the guide plates 44, the longitudinal bars 45 and the guide reinforcements 47. The handles 24 are now fully retracted.

Figure 7:
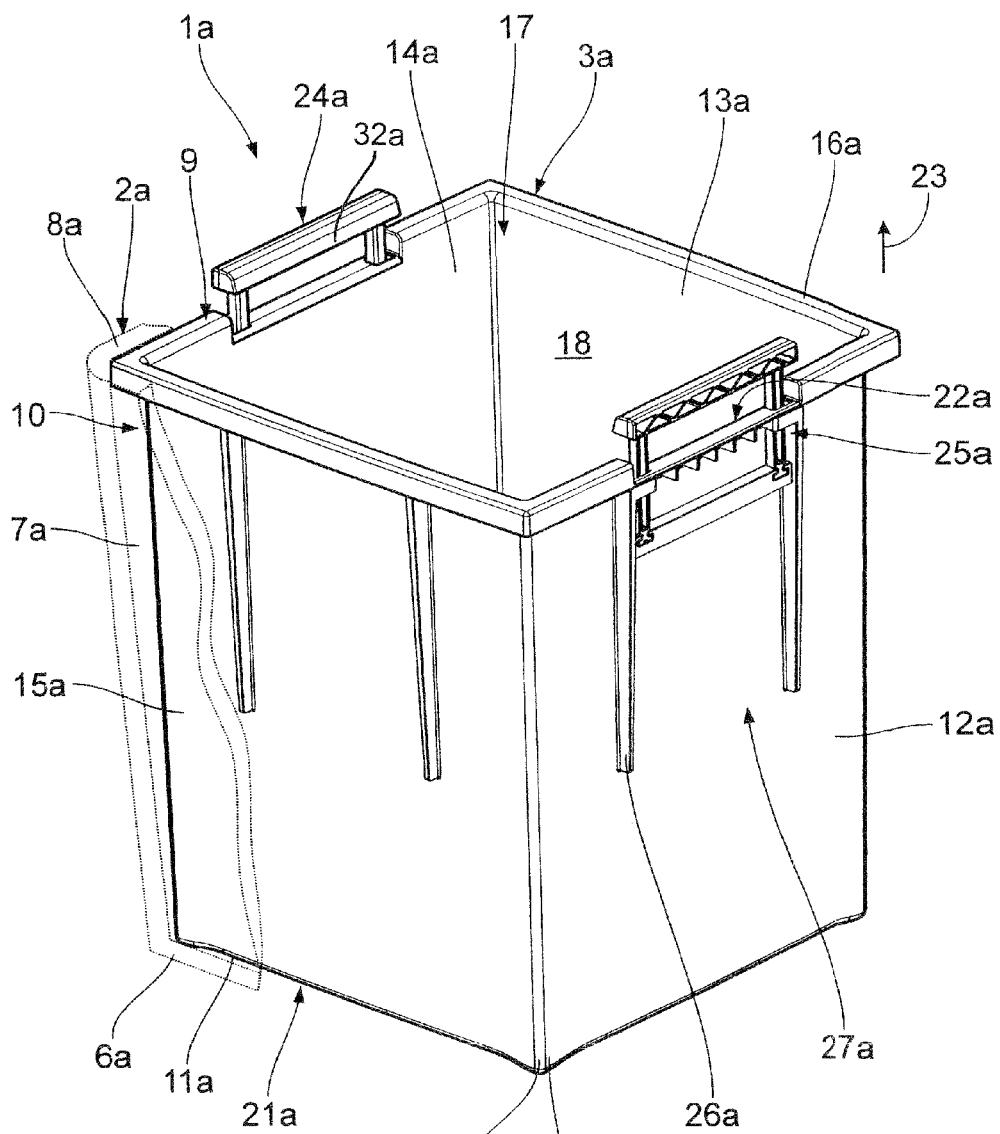
Figure 8:
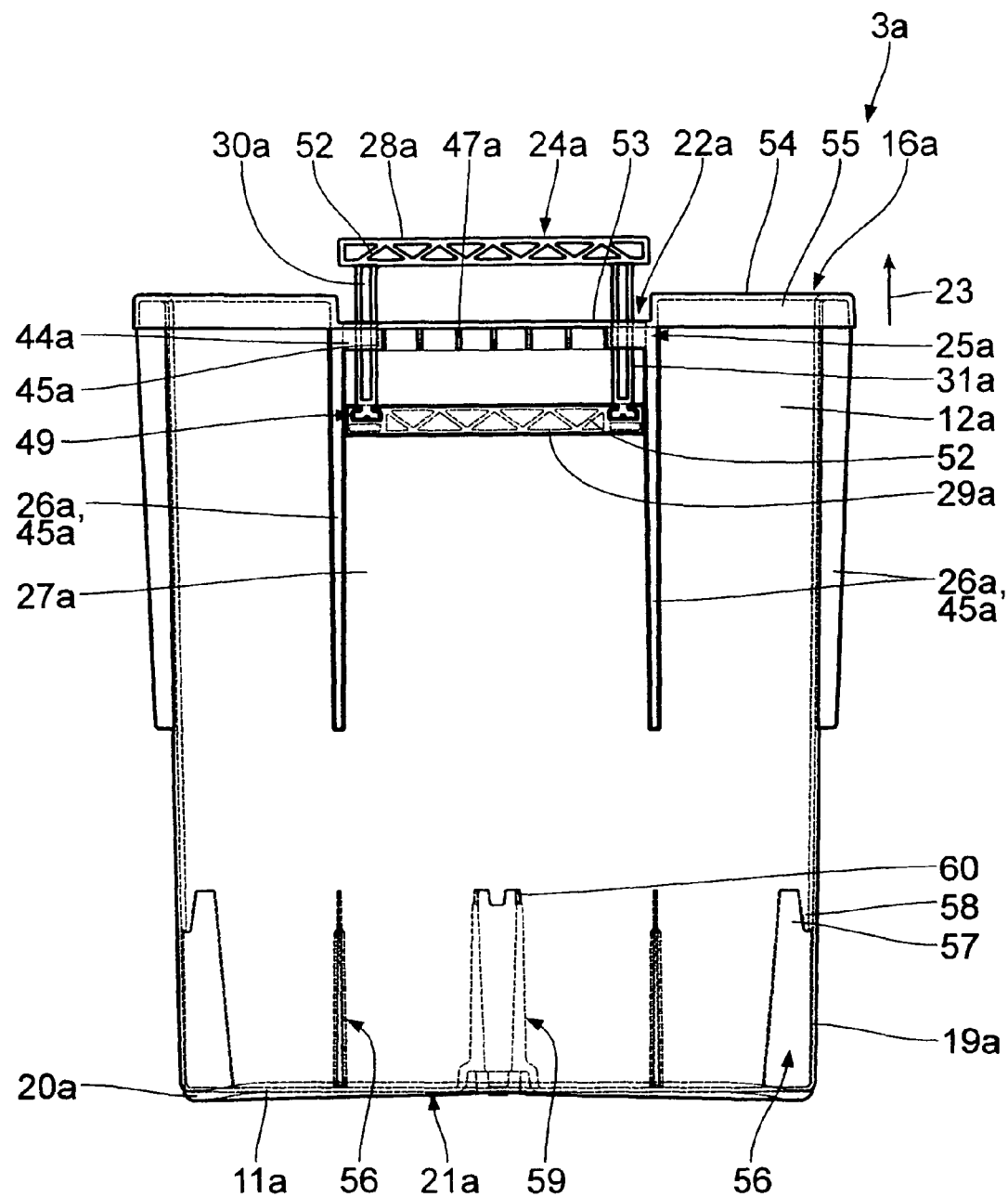
Figure 9:
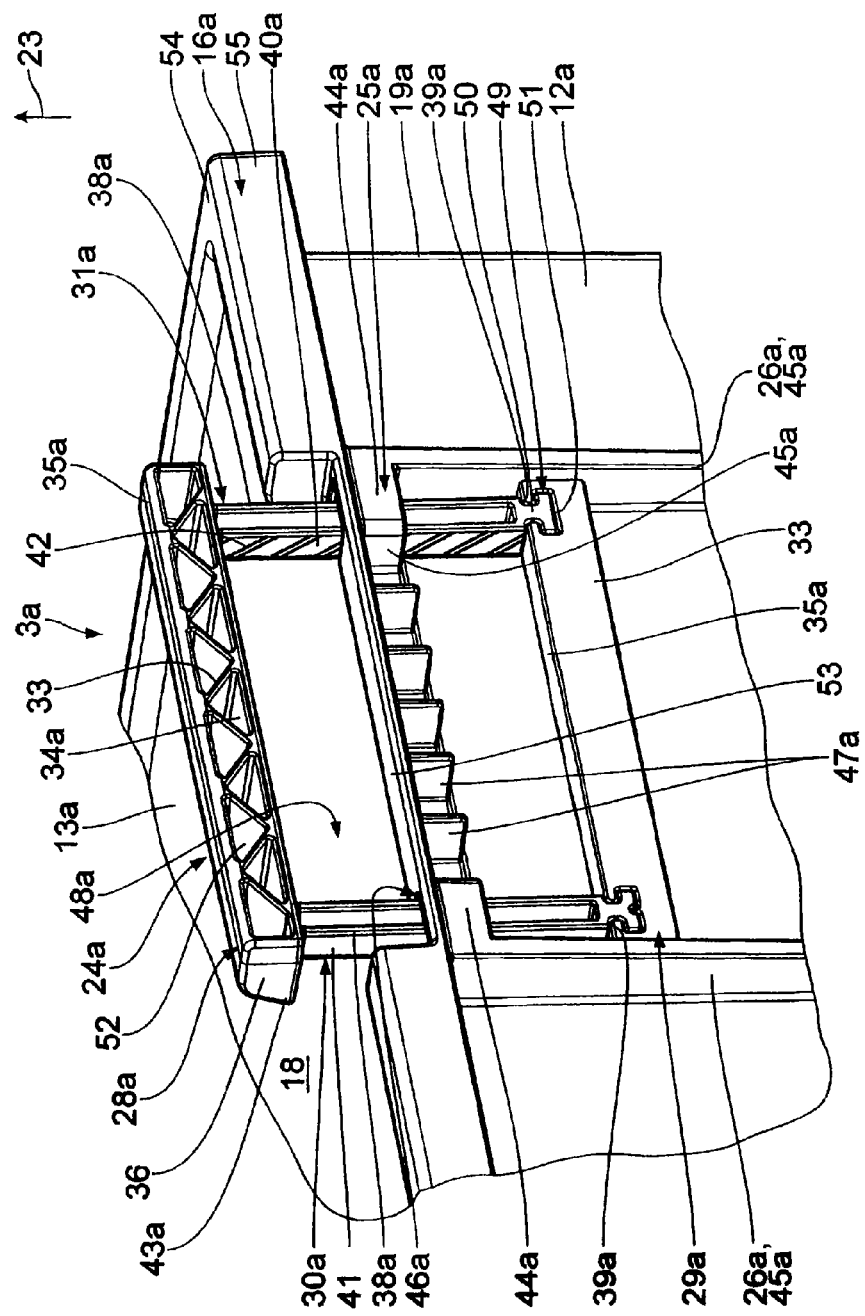

A second embodiment of the invention will now be described in the following with reference to FIG. 7 to 9. Parts of the same construction have been given the same reference numerals as in the first embodiment, reference being made here to the description thereof. Parts which are of a different construction but have a similar function have been given the same reference numerals followed by the letter a. The fundamental difference compared to the first embodiment is the configuration of the handles 24a and the handle guides 25a. The handle 24a and the handle guide 25a on the side wall 12a of the container will now be described in the following in more detail.

To facilitate assembly on the insert container 3a, the handle 24a is composed of two parts. The first crossbar 28a is configured integrally with the longitudinal bars 30a, 31a, these longitudinal bars 30a, 31a being detachably connected by push-fit fittings 49 to the second crossbar 29a. The crossbars 28a, 29a each have an inner side wall 32a facing the plant space 18a, an outer side wall 33a remote from the plant space 18, a lower side wall 34a facing the base 11a of the container and a side wall 35a remote from the container base 11a, as well as end walls 36a facing the reinforcement struts 26a. The longitudinal bars 30a, 31a also have profiled side walls 40a facing one another and exposed side walls 41a opposite to profiled side walls 40a. The push-fit fittings 49 each have a spring 50 which is T-shaped in cross-section and is formed in one piece on the end wall 39a, facing the crossbar 29a, of the relevant longitudinal bar 30a, 31a. The springs 50 each extend into a suitably shaped groove 51 extending from the upper side wall 35a to approximately the centre of the second crossbar 29a. The push-fit fittings 49 are aligned such that the second cross bar 29a with the grooves 51 may be pushed onto the springs 51, connected to the longitudinal bars 30a, 31a, in the direction of the first side wall 12a of the container. In order to make a saving in terms of material and weight, the longitudinal bars 30a, 31a and the crossbars 28a, 29a are U-shaped in cross-section, crossbar struts 52 being positioned in a zig-zag shape in each case between the lower side wall 34a and the upper side wall 35a of the crossbars 28a, 29a. In the case of the second cross-bars 39a, the crossbar struts 52 extend only in the region between the push-fit fittings 49. The crossbars 28a, 29a each have an outer wall 33a remote from the plant space.

The handle guide 25a is formed by the side wall 12a of the container, guides plates 44a extending parallel and at a distance to said side wall 12a and by longitudinal struts 45a extending between the side wall 12a of the container and the guide plates 44a transversely thereto. To receive a longitudinal bar 30a, 31a, the side wall 12a of the container, one of the guide plates 44a and two of the longitudinal struts 45a each form a guide opening 46a, a longitudinal strut 45a simultaneously being configured as a reinforcement strut 26a. Positioned between the longitudinal struts 45a facing the profiled side walls 40a are a large number of guide reinforcements 47a also configured as longitudinal struts, said guide reinforcements 47a being configured integrally with a reinforcement strip 53 extending transversely to the pull-out direction 23. This reinforcement strip 53 is connected to the side wall 12a of the container, the reinforcement struts 26a, the guide plates 44a, the longitudinal struts 45a and the guide reinforcements 47a, the reinforcement strip 53 together with the first crossbar 28a and the longitudinal bars 30a, 31a defining the reach-through opening 48a.

To further reinforce the insert container 3a in the region of the plant opening 17, the container edge 16a has a first peripheral portion 54 extending substantially transversely to the side walls 12a, 13a, 14a, 15a of the container and a second peripheral portion 55 formed in one piece therewith and extending substantially parallel to the respective container side walls 12a, 13a, 14a, 15a. The peripheral portions 54, 55 are integrally connected to the reinforcement struts 26a in the region of the recesses 22a.

The reinforcement struts 26a extend from the edge 16a of the container to approximately the centre of the side walls 12a, 13a, 14a, 15a of the container. A configuration of this type of the reinforcement struts 26a makes it easier to stack a plurality of insert containers 3a.

To reinforce the insert container 3a in the region of the base 11a of the container, base reinforcement struts 56, configured integrally with the container base 11a and the respective container side wall 12a, 13a, 14a, 15a extend from the base 11a of the container into the plant space 18. The base reinforcement struts 56 align with the reinforcement struts 26a and are tapered in the pull-out direction 23. At their ends remote from the container base 11a, the base reinforcement struts 56 each have a latching nose 57 extending in the pull-out direction 23, a wedge-shaped latching groove 58 being formed between the latching noses 57 and the respective side wall 12a, 13a, 14a, 15a of the container. The base reinforcement struts 56 improve the stability of the container base 11a, so that said base 1a is prevented from caving in. Furthermore, the latching noses 57 make it possible to suspend and secure an additional separating base, so that a water supply chamber is formed between this separating base and the base 11a of the container.

A water overflow 59 extending from the container base 11a in the pull-out direction 23 into the plant space 18 is positioned in the centre of the container base 11a. This water overflow 59 is in the shape of a hollow cylinder, the free overflow end 60 aligning with the latching noses 57 of the base reinforcement struts 56 and also being able to be latched with the separating base. Alternatively, the insert container 3a may also be configured without a water overflow 59.

The spacers 20a of the insert container 3a are configured as recesses in the container base 11a in the region of the longitudinal edges 19a. When the container 3a has been inserted, the spacers 20a rest against the over pot base 6a, thereby forming the first interspace 21a between the over pot base 6a and the container base 11a.

During assembly of the handle 24a, the longitudinal bars 30a, 31a which are not connected to the second crossbar 29a are first of all guided through the guide openings 46a and pushed into the handle guide 25a in a direction opposite the pull-out direction 23. The second crossbar 29a is pushed onto the springs 50 of the push-fit fittings 49 with the grooves 51 of said push-fit fittings 49 transversely to the pull-out direction 23, so that the second crossbar 29a is connected to the longitudinal bars 30a, 31a. The pushing-on action of the second crossbar 29a is restricted either by the side wall 12a of the container or by additional stop walls, it being possible for these stop walls to be formed either on the longitudinal bars 30a, 31a or on the second crossbar 29a. Reference is made to the first embodiment concerning the further mode of operation of the plant pot arrangement 1a.

What is claimed is:

1. Plant pot arrangement comprising:
   an over pot (2; 2a);
   an insert container (3; 3a) positioned in the over pot (2; 2a) and removable therefrom, for receiving a plant (4) with a substrate (5), the insert container (3; 3*a*) defining a space (18) for a plant, and being open at an upper container edge (16; 16*a*), at least one handle (24; 24*a*) on the insert container (3, 3*a*) for removing the insert container (3; 3*a*) from the over pot (2; 2*a*), and at least one handle guide (25; 25*a*) disposed on at least one outer surface of the insert container (3; 3*a*) positioned in the region of the container edge (16; 16*a*), the at least one handle (24; 24*a*) being slidably disposed in the at least one handle guide, such that the at least one handle can be slid out of the at least one handle guide in a pull-out direction (23) without penetrating the space for the plant to allow removal of the insert container (3; 3*a*) from the over pot (2; 2*a*), wherein the pull-out direction is a direction in which the insert container (3, 3*a*) is moved when the insert container (3, 3*a*) is removed from the over pot (2, 2*a*).

2. Plant pot arrangement according to claim 1, wherein the at least one handle (24; 24*a*) is positioned outside the space (18) for a plant.

3. Plant pot arrangement according to claim 1, wherein the at least one handle (24; 24*a*) has a projection (43; 43*a*) extending into the plant space (18).

4. Plant pot arrangement according to claim 1, wherein the at least one handle (24; 24*a*) has at least one longitudinal bar (30, 31, 30*a*, 31*a*) extending in the pull-out direction (23) and received in the handle guide (25; 25*a*).

5. Plant pot arrangement according to claim 4, wherein the at least one longitudinal rod (30, 31; 30*a*, 31*a*) has a profiling (42).

6. Plant pot arrangement according to claim 1, wherein the handle guide (25; 25*a*) is formed in one piece on a side wall (12, 14; 12*a*, 14*a*) of the insert container (3; 3*a*).

7. Plant pot arrangement according to claim 1, wherein the handle guide (25; 25*a*) has at least two longitudinal struts (45; 45*a*).

8. Plant pot arrangement according to claim 7, wherein at least one of the longitudinal struts (45; 45*a*) is configured as a reinforcement strut (26; 26*a*) for reinforcing the inset container (3; 3*a*).

9. Plant pot arrangement according to claim 1, wherein the insert container (3; 3*a*) and the at least one handle (24; 24*a*) are made of plastics material.

10. Plant pot arrangement according to claim 1, wherein at least one push-fit fitting (49) positioned on the at least one handle (24*a*) is provided for positioning the at least one handle (24*a*) in the handle guide (25*a*).

11. Plant pot arrangement according to claim 1, wherein the at least one handle (24; 24*a*) has at least one cross-bar (29; 29*a*) for restricting the movement in the pull-out direction (23), and the at least one cross-bar comprises a first cross-bar (28; 28*a*) and a second cross-bar (29; 29*a*) parallel to said first cross-bar, said first and second cross-bars being integrally connected with a first longitudinal bar (30; 30*a*) and a second longitudinal bar (31; 31*a*) extending parallel to the first longitudinal bar (30; 30*a*), substantially forming a rectangle.

12. Plant pot arrangement according to claim 1, wherein the edge (16; 16*a*) and two opposite container side walls (12, 14; 12*a*, 14*a*) have in each case a centrally located recess (22; 22*a*) for receiving the handles (24; 24*a*).

13. Plant pot arrangement according to claim 1, wherein the at least one handle (24; 24*a*) has at least one longitudinal bar (30, 31; 30*a*, 31*a*) extending in the pull-out direction (23) and received in the handle guide (25; 25*a*), wherein the handle guide (25; 25*a*) is formed by a side wall (12; 12*a*) of the container, a guide plate (44; 44*a*) extending parallel and at a distance to the container side wall (12; 12*a*) and two longitudinal struts (45; 45*a*) extending between the container side wall (12; 12*a*) and the guide plate (44; 44*a*) obliquely thereto.

14. Plant pot arrangement according to claim 13, further comprising a guide reinforcement (47; 47*a*) extending between the container side wall (12, 12*a*) and the guide plate (44, 44*a*) and positioned between the two longitudinal struts (45; 45*a*), and wherein the longitudinal struts (45, 45*a*) and the guide reinforcement (47; 47*a*) are each flush with the side wall (12; 12*a*) of the container and the guide plate (44; 44*a*).

15. Plant pot arrangement according to claim 1, wherein spacers (20; 20*a*) are formed in one piece on the insert container (3; 3*a*) in a region of longitudinal edges (19; 19*a*) on the side of a container base (11; 11*a*) opposite the plant space (18), said spacer (20; 20*a*) extending flush with side walls (12, 13, 14, 15; 12*a*, 13*a*, 14*a*, 15*a*) of the container.

* * * * *